(12) United States Patent
Jiang et al.

(10) Patent No.: US 10,766,368 B2
(45) Date of Patent: Sep. 8, 2020

(54) DUAL FUNCTION BATTERY SYSTEM AND METHOD

(71) Applicant: CPS TECHNOLOGY HOLDINGS LLC, New York, NY (US)

(72) Inventors: Junwei Jiang, Whitefish Bay, WI (US);
Patrick T. Hurley, Mequon, WI (US);
Perry M. Wyatt, Fox Point, WI (US);
Thomas M. Watson, Milwaukee, WI (US)

(73) Assignee: CPS TECHNOLOGY HOLDINGS LLC, New York, NY (US)

( * ) Notice: Subject to any disclaimer, the term of this patent is extended or adjusted under 35 U.S.C. 154(b) by 0 days.

(21) Appl. No.: 16/167,253

(22) Filed: Oct. 22, 2018

(65) Prior Publication Data

US 2019/0054827 A1    Feb. 21, 2019
US 2019/0359063 A9    Nov. 28, 2019

Related U.S. Application Data

(63) Continuation of application No. 14/013,392, filed on Aug. 29, 2013, now Pat. No. 10,106,038.

(Continued)

(51) Int. Cl.
*B60L 7/10* (2006.01)
*H01M 10/48* (2006.01)
(Continued)

(52) U.S. Cl.
CPC .............. *B60L 7/10* (2013.01); *B60L 1/08* (2013.01); *B60L 50/66* (2019.02); *B60L 58/13* (2019.02);
(Continued)

(58) Field of Classification Search
CPC .......... B60L 58/18; B60L 58/20; B60L 50/66; H02J 7/0024; H02J 7/0014; H01M 10/482;
(Continued)

(56) References Cited

U.S. PATENT DOCUMENTS 6,504,344 B1 *  1/2003  Adams .................. H02J 7/0019
                                                    320/132
8,013,574 B2 *  9/2011  Naganuma .......... H01M 10/441
                                                    320/118

(Continued)

*Primary Examiner* — Jared Fureman
*Assistant Examiner* — Emmanuel Dominique
(74) *Attorney, Agent, or Firm* — Christopher & Weisberg, P.A.

(57) ABSTRACT

An energy storage system for supporting dual electrical functions of a vehicle includes an energy storage unit having a plurality of energy storage modules connected in series, a plurality of sensing units for sensing state of charges of the plurality of energy storage modules, and a pair of primary voltage terminals. The series connected plurality of energy storage modules is connectable across the pair of primary voltage terminals during a key-on state of the vehicle to supply energy storage power at a first voltage level to support primary electrical functions of the vehicle. The energy storage system is further configured to select a subset of the plurality of energy storage modules during a key-off state of the vehicle to connect across a pair of secondary voltage terminals using a switch network to supply energy storage power at a second voltage level.

19 Claims, 11 Drawing Sheets

Related U.S. Application Data

(60) Provisional application No. 61/746,818, filed on Dec. 28, 2012, provisional application No. 61/800,103, filed on Mar. 15, 2013.

(51) Int. Cl.

| | | |
|---|---|---|
| *H02J 7/00* | (2006.01) | |
| *B60L 1/08* | (2006.01) | |
| *H01M 10/42* | (2006.01) | |
| *B60L 50/60* | (2019.01) | |
| *B60L 58/20* | (2019.01) | |
| *B60L 58/18* | (2019.01) | |
| *B60L 58/13* | (2019.01) | |
| *H01M 4/131* | (2010.01) | |
| *H01M 4/136* | (2010.01) | |

(52) U.S. Cl.
CPC ............ *B60L 58/18* (2019.02); *B60L 58/20* (2019.02); *H01M 10/425* (2013.01); *H01M 10/482* (2013.01); *H02J 7/0014* (2013.01); *H02J 7/0024* (2013.01); *B60L 2240/545* (2013.01); *B60L 2240/547* (2013.01); *B60L 2240/549* (2013.01); *B60L 2260/26* (2013.01); *H01M 4/131* (2013.01); *H01M 4/136* (2013.01); *H01M 2010/4278* (2013.01); *H01M 2220/20* (2013.01); *Y02T 10/7016* (2013.01); *Y02T 10/7044* (2013.01); *Y02T 10/7055* (2013.01); *Y02T 10/7066* (2013.01)

(58) Field of Classification Search
CPC ...... H01M 2220/20; H01M 2010/4278; Y02T 10/7066
See application file for complete search history.

(56) References Cited

U.S. PATENT DOCUMENTS

| | | | | |
|---|---|---|---|---|
| 8,228,044 | B2* | 7/2012 | Kotz | B60L 7/10 320/166 |
| 9,190,861 | B2* | 11/2015 | Kim | F02N 11/0866 |
| 9,287,725 | B2* | 3/2016 | Huffman | H02J 7/0013 |
| 2001/0019224 | A1* | 9/2001 | Amano | B60L 58/20 307/10.7 |
| 2002/0167291 | A1* | 11/2002 | Imai | H02J 7/0018 320/119 |
| 2003/0139888 | A1* | 7/2003 | Burns | H02J 7/0019 702/63 |
| 2005/0285559 | A1* | 12/2005 | Siddiqui | B60L 1/14 320/103 |
| 2006/0006841 | A1* | 1/2006 | Lee | H01M 10/4207 320/116 |
| 2009/0091332 | A1* | 4/2009 | Emori | B60L 58/21 324/537 |
| 2009/0102422 | A1* | 4/2009 | Naganuma | B60L 58/22 320/118 |
| 2010/0050671 | A1* | 3/2010 | Kahn | B60H 1/00378 62/190 |
| 2010/0261043 | A1* | 10/2010 | Kim | H01M 10/4207 429/61 |
| 2012/0001480 | A1* | 1/2012 | Favaretto | B60K 6/48 307/9.1 |
| 2012/0056478 | A1* | 3/2012 | Omoto | B60L 58/10 307/11 |
| 2013/0038289 | A1* | 2/2013 | Tse | H02J 7/0013 320/118 |
| 2013/0249492 | A1* | 9/2013 | Kim | H02J 7/0063 320/128 |

* cited by examiner

DUAL FUNCTION BATTERY SYSTEM AND METHOD

CROSS REFERENCE TO RELATED APPLICATIONS

This application is a continuation of U.S. patent application Ser. No. 14/013,392, entitled "DUAL FUNCTION ENERGY STORAGE SYSTEM AND METHOD," filed Aug. 29, 2013, which issued on Oct. 23, 2018 as U.S. Pat. No. 10,106,038, which claims benefit of U.S. Provisional Patent Application Ser. No.: 61/746,818, entitled "DUAL FUNCTION BATTERY SYSTEM DESIGN," filed Dec. 28, 2012, and of U.S. Provisional Patent Application Ser. No.: 61/800,103, entitled "DUAL FUNCTION BATTERY SYSTEM DESIGN," filed on Mar. 15, 2013, each of which are hereby incorporated by reference.

BACKGROUND

The present disclosure relates generally to the field of batteries and battery modules. More specifically, the present disclosure relates to battery cells that may be used in vehicular contexts, as well as other energy storage/expending applications.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

A vehicle that uses one or more battery systems for supporting propulsion, start stop, and/or regenerative braking functions can be referred to as an xEV, where the term "xEV" is defined herein to include all of the below described electrical vehicles, or any variations or combinations thereof.

A "start-stop vehicle" is defined as a vehicle that can disable the combustion engine when the vehicle is stopped and utilize a battery (energy storage) system to continue powering electrical consumers onboard the vehicle, including the entertainment system, navigation, lights, or other electronics, as well as to restart the engine when propulsion is desired. A lack of brake regeneration or electrical propulsion distinguishes a "start-stop vehicle" from other forms of xEVs.

As will be appreciated by those skilled in the art, hybrid electric vehicles (HEVs) combine an internal combustion engine (ICE) propulsion system and a battery-powered electric propulsion system, such as 48 volt, 130 volt, or 300 volt systems. The term HEV may include any variation of a hybrid electric vehicle, in which features such as brake regeneration, electrical propulsion, and stop-start are included.

A specific type of xEV is a micro-hybrid electric vehicle ("mHEV or "micro-HEV"). Micro-HEV vehicles typically operate at low voltage, which is defined to be under 60V. Micro-HEV vehicles typically provide start stop, and distinguish themselves from "start-stop vehicles" through their use of brake regeneration. The brake regeneration power can typically range from 2 kW to 12 kW at peak, although other values can occur as well. A Micro-HEV vehicle can also provide some degree of electrical propulsion to the vehicle. If available, the amount of propulsion will not typically be sufficient to provide full motive force to the vehicle.

Full hybrid electric vehicles (FHEVs) and Mild hybrid electric vehicles (Mild-HEVs) may provide motive and other electrical power to the vehicle using one or more electric motors, using only an ICE, or using both. FHEVs are typically high-voltage (>60V), and are usually between 200V and 400V. Mild-HEVs typically operate between 60V and 200V. Depending on the size of the vehicle, a Mild-HEV can provide between 10-20 kW of brake regeneration or propulsion, while a FHEV provides 15-100 kW. The Mild-HEV system may also apply some level of power assist, during acceleration for example, to supplement the ICE, while the FHEV can often use the electrical motor as the sole source of propulsion for short periods, and in general uses the electrical motor as a more significant source of propulsion than does a Mild-HEV.

In addition, a plug-in electric vehicle (PEV) is any vehicle that can be charged from an external source of electricity, such as wall sockets, and the energy stored in the rechargeable battery packs drives or contributes to drive the wheels. PEVs are a subcategory of xEV that include all-electric or battery electric vehicles (BEVs), plug-in hybrid electric vehicles (PHEVs), and electric vehicle conversions of hybrid electric vehicles and conventional ICE vehicles. BEVs are driven entirely by electric power and lack an internal combustion engine. PHEVs have an internal combustion engine and a source of electric motive power, with the electric motive power capable of providing all or nearly all of the vehicle's propulsion needs. PHEVs can utilize one or more of a pure electric mode ("EV mode"), a pure internal combustion mode, and a hybrid mode.

xEVs as described above may provide a number of advantages as compared to more traditional gas-powered vehicles using only ICEs and traditional electrical systems, which are typically 12 volt systems powered by a lead acid battery. For example, xEVs may produce fewer undesirable emission products and may exhibit greater fuel efficiency as compared to traditional vehicles and, in some cases, such xEVs may eliminate the use of gasoline entirely, as is the case of certain types of BEVs.

As xEV technology continues to evolve, there is a need to provide improved power sources (e.g., battery systems or modules) for such vehicles. For example, it is desirable to increase the distance that such vehicles may travel without the need to recharge the batteries. Additionally, it may also be desirable to improve the performance of such batteries and to reduce the cost associated with the battery systems.

Conventional xEVs have been found to be functionally limited by their electric energy systems that supply power to their electric motor/generator and vehicle accessories. Typically, an electric motor is powered by an energy source that needs to store energy suitable for high-power discharges as well as for electric demands generated by various driving conditions.

Moreover, in conventional xEVs two or more different stored power distribution networks are required with different voltage levels to provide stored power to different power consuming loads of the vehicle. A typical Mild-HEV or FHEV usually contains a dual battery system. Unfortunately, the use of two batteries significantly adds to the complexity and cost of the hybrid vehicles.

Therefore, there is a need for a battery system that can handle the requirement for different voltage levels of an energy storage system without including a plurality of batteries.

SUMMARY

Disclosed herein is a dual function energy storage system and method for micro, mild, and full hybrid electric vehicles.

In one aspect, an energy storage system for a vehicle includes an energy storage unit having a plurality of energy storage modules connected in series, a plurality of sensing units for sensing state of charges of the plurality of energy storage modules, a pair of primary voltage terminals, wherein the series connected plurality of energy storage modules is connectable across the pair of primary voltage terminals to supply energy storage power at a first voltage level to support primary electrical functions of the vehicle, a pair of secondary voltage terminals, and an energy storage management system and a controller. The controller is configured to select a first subset of the plurality of energy storage modules to connect across the pair of secondary voltage terminals to supply energy storage power at a second voltage level, which is lower that the first voltage level, to support secondary electrical functions of the vehicle. Based on a sensed state provided by the plurality of sensing units, the controller determines whether the first subset of the plurality of energy storage modules should be disconnected from the pair of secondary voltage terminals and a second subset of the plurality of energy storage modules connected across the pair of secondary voltage terminals to continue supporting the secondary electrical functions of the vehicle.

In another aspect, a computer-implemented method for performing dual functions of an energy storage system in a vehicle includes providing stored electrical power for supporting primary electrical functions of the vehicle during a key-on state at a pair of primary voltage terminals of the energy storage system having a plurality of energy storage modules connected in series across the pair of primary voltage terminals, detecting when the vehicle has been turned off, and providing stored electrical power from a reduced number of the plurality of energy storage modules for supporting secondary electrical functions of the vehicle, thereby operating key-off loads of the vehicle at a pair of secondary terminals by connecting the reduced number of the plurality of energy storage modules across the pair of secondary terminals.

In yet another aspect, a computing system includes at least one processing unit and at least one memory unit storing instructions that are operable, when executed by the at least one processing unit, to cause the at least one processing unit to perform the above-introduced method.

These as well as other aspects, advantages, and alternatives will become apparent to those of ordinary skill in the art by reading the following detailed description, with reference where appropriate to the accompanying drawings. Further, it should be understood that the disclosure provided in this summary section and elsewhere in this document is intended to discuss the embodiments by way of example only and not by way of limitation.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
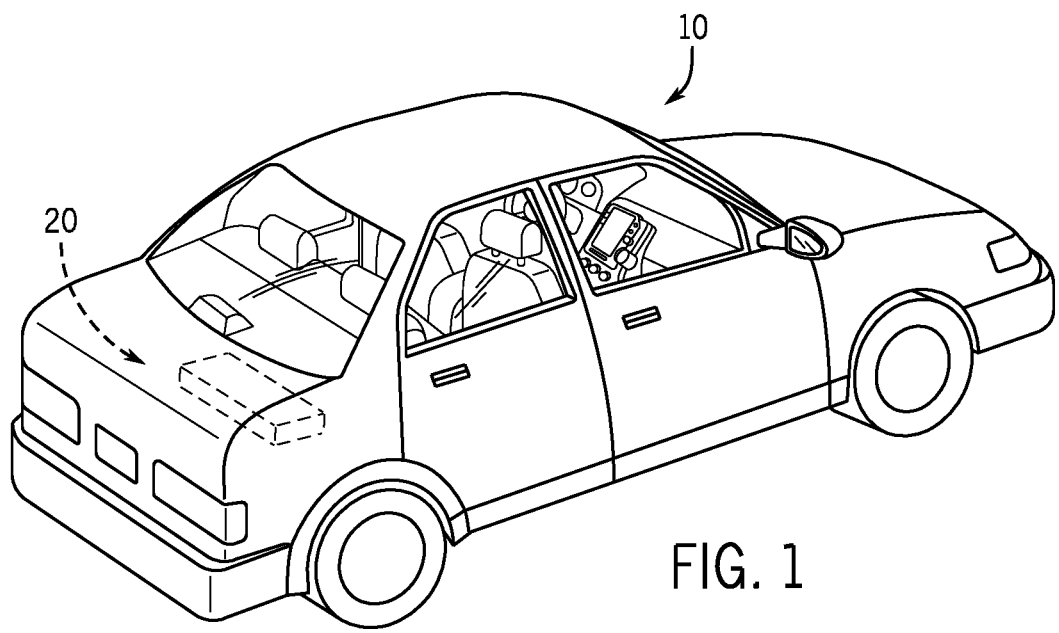
FIG. 1 is a perspective view of a vehicle (an xEV) having a battery system contributing all or a portion of the power for the vehicle, in accordance with an embodiment of the present approach.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

As discussed above, there are several different types of xEVs. Although some vehicle manufacturers, such as Tesla, produce only xEVs and, thus, can design the vehicle from scratch as an xEV, most vehicle manufacturers produce primarily traditional ICEs. Thus, when one of these manufacturers also desires to produce an xEV, it often utilizes one of its traditional vehicle platforms as a starting point. As can be appreciated, when a vehicle has been initially designed to use a traditional electrical system powered by a single lead acid battery and to utilize only an ICE for motive power, converting such a vehicle into its HEV version can pose many packaging problems. For example, a FHEV uses not only these traditional components, but one or more electric motors must be added along with other associated components. As another example, a Micro-HEV also uses not only these traditional components, but a higher voltage battery (e.g., a 48V lithium ion battery module) must be placed in the vehicle to supplement or replace the 12V lead acid battery along with other components such as a belt integrated starter-generator, sometimes referred to as a belt alternator starter (BAS) as described in further detail below. Hence, if a battery system can be designed to reduce such packaging problems, it would make the conversion of a traditional vehicle platform into an xEV less costly and more efficient. As used herein, the BAS is not intended to be limited to a belt-driven alternator starter, as other types of drives could be used.

The battery systems described herein may be used to provide power to a number of different types of xEVs as well as other energy storage applications (e.g., electrical grid power storage systems). Such battery systems may include one or more battery modules, each battery module having a number of battery cells (e.g., lithium ion electrochemical cells) arranged to provide particular voltages and/or currents useful to power, for example, one or more components of an xEV. Presently disclosed embodiments include lithium ion battery modules that are capable of providing more than one voltage. In particular, certain disclosed battery systems may provide a first voltage (e.g., 12V), for example, to power ignition of a combustion engine using a traditional starter motor and/or support conventional 12V accessory loads, and may provide a second voltage (e.g., 48V), for example, to power a BAS and to power one or more vehicle accessories when the combustion engine is not running, for use in a micro-hybrid system for example. Indeed, in certain embodiments, not only may a single battery system provide two voltages (e.g., 12V and 48V), but it can provide them from a package having a form factor equivalent to a traditional lead acid 12V battery, thus making packaging and conversion of a traditional vehicle to a Micro-HEV simpler, less costly and more efficient.

Present embodiments also include physical battery module features, assembly components, manufacturing and assembling techniques, and so forth, that facilitate providing disclosed battery modules and systems that have a desired form factor (e.g., dimensions corresponding to a traditional lead acid battery). Further, as set forth in detail below, the disclosed battery module embodiments include a number of heat transfer devices (e.g., heat sinks, liquid-cooling blocks, heat transfer foams, phase change materials (PCMs), and so forth) that may be used to passively or actively maintain one or more temperatures of the battery module during operation.

With the foregoing in mind, FIG. 1 is a perspective view of an xEV 10 in the form of an automobile (e.g., a car) having a battery system 20 in accordance with present embodiments for providing all or a portion of the power (e.g., electrical power and/or motive power) for the vehicle 10, as described above. Although the xEV 10 may be any of the types of xEVs described above, by specific example, the xEV 10 may be a Micro-HEV, including an ICE equipped with a micro-hybrid system which includes a start-stop system that may utilize the battery system (energy storage system (ESS)) 20 to power at least one or more accessories (e.g., AC, lights, consoles, etc.), as well as the ignition of the ICE, during start-stop cycles.

Further, although the xEV 10 is illustrated as a car in FIG. 1, the type of vehicle may differ in other embodiments, all of which are intended to fall within the scope of the present disclosure. For example, the xEV 10 may be representative of a vehicle including a truck, bus, industrial vehicle, motorcycle, recreational vehicle, boat, or any other type of vehicle that may benefit from the use of electric power. Additionally, while the battery system 20 is illustrated in FIG. 1 as being positioned in the trunk or rear of the vehicle, according to other embodiments, the location of the battery system 20 may differ. For example, the position of the battery system 20 may be selected based on the available space within a vehicle, the desired weight balance of the vehicle, the location of other components used with the battery system 20 (e.g., battery management systems, vents or cooling devices, etc.), and a variety of other considerations.

Figure 2:
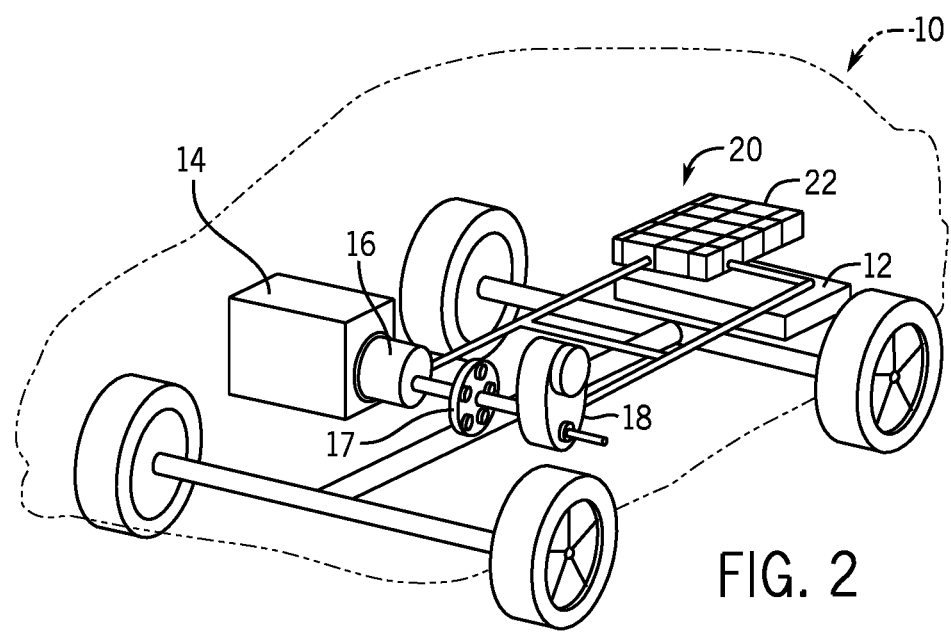
FIG. 2 is a cutaway schematic view of the xEV embodiment of FIG. 1 in the form of a hybrid electric vehicle (HEV), in accordance with an embodiment of the present approach.

FIG. 2 illustrates a cutaway schematic view of an embodiment of the xEV 10 of FIG. 1, provided in the form of an HEV having the battery system 20, which includes one or more battery modules 22. In particular, the battery system 20 illustrated in FIG. 2 is disposed toward the rear of the vehicle 10 proximate a fuel tank 12. In other embodiments, the battery system 20 may be provided immediately adjacent the fuel tank 12, provided in a separate compartment in the rear of the vehicle 10 (e.g., a trunk), or provided in another suitable location in the xEV 10. Further, as illustrated in FIG. 2, an ICE 14 may be provided for times when the xEV 10 utilizes gasoline power to propel the vehicle 10. The vehicle 10 also includes an electric motor 16, a power split device 17, and a generator 18 as part of the drive system.

The xEV vehicle 10 illustrated in FIG. 2 may be powered or driven by the battery system 20 alone, by the combustion engine 14 alone, or by both the battery system 20 and the engine 14. It should be noted that, in other embodiments of the present approach, other types of vehicles and configurations for the vehicle drive system may be utilized, and that the schematic illustration of FIG. 2 should not be considered to limit the scope of the subject matter described in the present application. According to various embodiments, the size, shape, and location of the battery system 20, the type of vehicle, the type of xEV technology, and the battery chemistry, among other features, may differ from those shown or described.

The battery system 20 may generally include one or more battery modules 22, each having a plurality of battery cells (e.g., lithium ion electrochemical cells), which are discussed in greater detail below. The battery system 20 may include features or components for connecting the multiple battery modules 22 to each other and/or to other components of the vehicle electrical system. For example, the battery system 20 may include features that are responsible for monitoring and controlling the electrical and thermal performance of the one or more battery modules 22.

Figure 3:
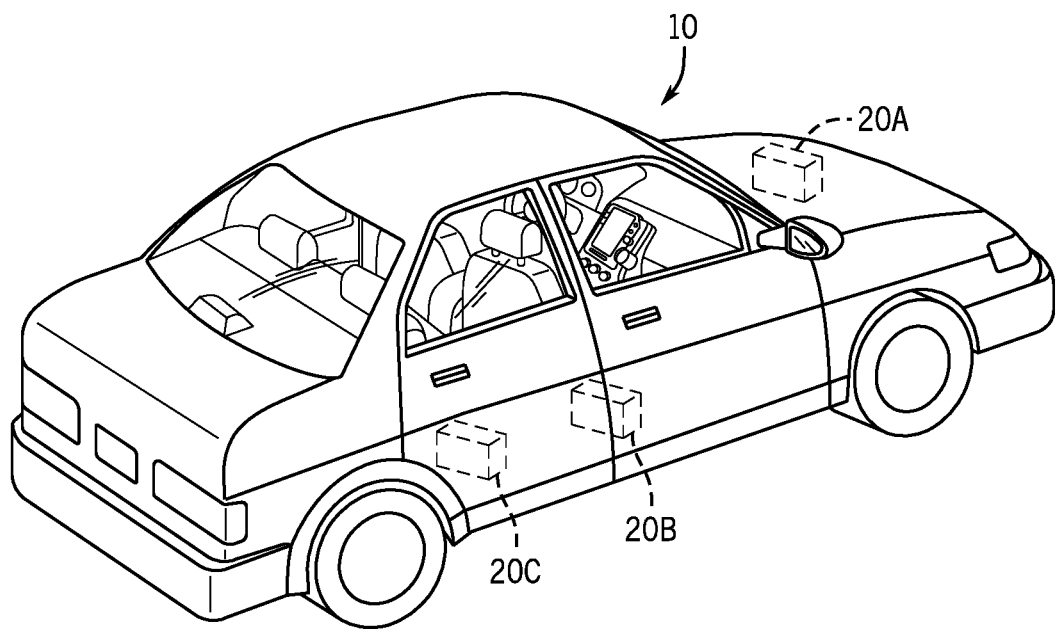
FIG. 3 is a cutaway schematic view of an embodiment of the xEV of FIG. 1 in the form of a micro-hybrid electric vehicle (Micro-HEV), in accordance with an embodiment of the present approach.

FIG. 3 illustrates a cutaway schematic view of another embodiment of the xEV 10 of FIG. 1, provided in the form of a Micro-HEV 10 having the battery system 20. As discussed above, the battery system 20 for use with a micro-hybrid system of an Micro-HEV 10 may include a single battery that provides a first voltage (e.g. 12V) and a second voltage (e.g. 48V) and that is substantially equivalent in size to a traditional 12V lead acid battery used in traditional ICEs. Hence, such a battery system 20 may be placed in a location in the Micro-HEV 10 that would have housed the traditional battery prior to conversion to a Micro-HEV. For example, as illustrated in FIG. 3, the Micro-HEV 10 may include the battery system 20A positioned similarly to a lead-acid battery of a typical combustion-engine vehicle (e.g., under the hood of the vehicle 10). By further example, in certain embodiments, the Micro- HEV 10 may include the battery system 20B positioned near a center of mass of the Micro-HEV 10, such as below the driver or passenger seat. By still further example, in certain embodiments, the Micro-HEV 10 may include the battery system 20C positioned below the rear passenger seat or near the trunk of the vehicle. It should be appreciated that, in certain embodiments, positioning a battery system 20 (e.g., battery system 20B or 20C) in or about the interior of the vehicle may enable the use of air from the interior of the vehicle to cool the battery system 20 (e.g., using a heat sink or a forced-air cooling design, as set forth in detail below).

Figure 4:
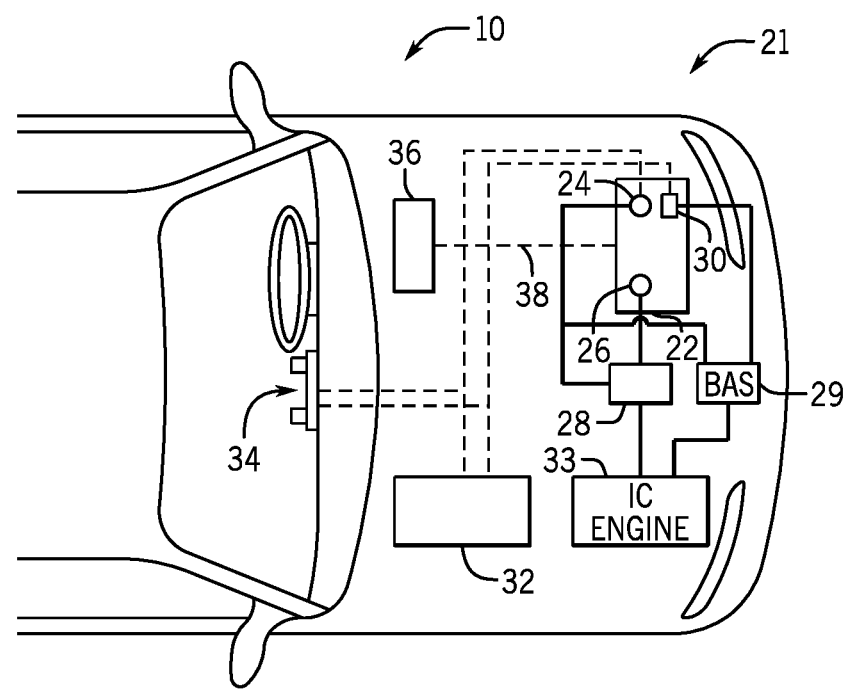
FIG. 4 is a schematic view of the Micro-HEV embodiment of FIG. 3 illustrating power distribution throughout the Micro-HEV, in accordance with an embodiment of the present approach.

FIG. 4 is a schematic view of an embodiment of the Micro-HEV 10 of FIG. 3 having an embodiment of an energy system 21 disposed under the hood of the vehicle 10 and includes battery system 20. As previously noted and as discussed in detail below, the battery system 20 may further have dimensions comparable to those of a typical lead-acid battery to limit or eliminate modifications to the Micro-HEV 10 design to accommodate the battery system 20. Further, the battery system 20 illustrated in FIG. 4 is a three-terminal battery that is capable of providing two different output voltages. For example, a first terminal 24 may provide a ground connection, a second terminal 26 may provide a 12V output, and a third terminal 30 may provide a 48V output. As illustrated, the 48V output of the battery module 22 may be coupled to a BAS 29, which may be used to start the ICE 33 during start-stop cycle, and the 12 V output of the battery module 22 may be coupled to a traditional ignition system (e.g., starter motor 28) to start the ICE 33 during instances when the BAS 29 is not used to do so. It should also be understood that the BAS 29 may also capture energy from a regenerative braking system or the like (not shown) to recharge the battery module 22.

It should be appreciated that the 48 V and 12 V outputs of the battery module 22 may also be provided to other components of the Micro-HEV 10. Examples of components that may utilize the 48 V output in accordance with present embodiments include radiator cooling fans, climate control fans, electric power steering systems, active suspension systems, electric air-conditioning systems, auto park systems, cooled seats, electric oil pumps, electric super/turbochargers, electric water pumps, heated seats, heated windscreen/defrosters, and engine ignitions. Examples of components that may utilize the 12 V output in accordance with present embodiments include window lift motors, vanity lights, tire pressure monitoring systems, sunroof motor controls, power seats, alarm systems, infotainment online features, navigation features, lane departure warning systems, electric parking brakes, and external lights. The examples set forth above are not exhaustive and there may be overlap between the listed examples. Indeed, for example, in some embodiments, features listed above as being associated with a 48 V load may utilize the 12 V output instead and vice versa.

In the illustrated embodiment, the 48 V output of the battery module 22 may be used to power one or more accessories of the Micro-HEV 10. For example, as illustrated in FIG. 4, the 48 V output of the battery module 22 may be coupled to the heating, ventilation, and air conditioning (HVAC) system 32 (e.g., including compressors, heating coils, fans, pumps, and so forth) of the Micro-HEV 10 to enable the driver to control the temperature of the interior of the Micro-HEV 10 during operation of the vehicle. This is particularly important in a Micro-HEV 10 during idle periods when the ICE 33 is stopped and, thus, not providing any electrical power via engine charging. As also illustrated in FIG. 4, the 48 V output of the battery module 22 may be coupled to the vehicle console 34, which may include entertainment systems (e.g., radio, CD/DVD players, viewing screens, etc.), warning lights and indicators, controls for operating the Micro-HEV 10, and so forth. Hence, it should be appreciated that the 48 V output may, in certain situations, provide a more efficient voltage at which to operate the accessories of the Micro-HEV 10 (e.g., compared to 12 V), especially when the ICE 33 is stopped (e.g., during start-stop cycles). It should also be appreciated that, in certain embodiments, the 48 V output of the battery module 22 may also be provided to any other suitable components and/or accessories (e.g., lights, switches, door locks, window motors, windshield wipers, and so forth) of the Micro-HEV 10.

Also, the Micro-HEV 10 illustrated in FIG. 4 includes a vehicle control unit/module (VCM) 36 that may control one or more operational parameters of the various components of the vehicle 10, and the VCM 36 may include at least one memory and at least one processor programmed to perform such tasks. Like other components of the Micro-HEV 10, the battery module 22 may be coupled to the VCM 36 via one or more communication lines 38, such that the VCM 36 may receive input from the battery module 22, and more specifically, the battery control module (BCM) of the battery module 22 (discussed in detail below). For example, the VCM 36 may receive input from the battery module 22 regarding various parameters, such as state of charge and temperature, and the VCM 36 may use these inputs to determine when to charge and/or discharge the battery module 22, when to discontinue charging the battery module 22, when to start and stop the ICE 33 of the Micro-HEV 10, whether to use the BAS 29 or the starter 28, and so forth.

As stated above, a conventional Mild-HEV, Micro-HEV, or FHEV includes an ESS in which two or more batteries are provided to meet the requirement for different voltage levels to provide stored power to different power consuming loads of the vehicle. For example, one battery may be a typical lead-acid (Pb-acid) battery to manage the key-off load of the vehicle, such as intrusion alarm and the like, or other key-on accessories. The other battery, such as a Ni-metal-hydride battery or Li-ion battery, provides the primary electrical functions, such as power assistance during acceleration, power regeneration during deceleration and the like. Unfortunately, the use of two batteries significantly adds to the complexity and cost of the vehicles. This is partly due to the need for voltage/current/power regulation devices, such as DC-DC converters, in many applications. Also, with regard to the batteries being used to the vehicle's electrical accessories, such as key-off accessories, there is a risk of deep depletion that can damage the assigned battery.

Accordingly, the present disclosure is directed to a single battery system configured to provide both the key-on electrical function of the vehicle, such as power assistance during the vehicle's acceleration modes, power regeneration during the vehicle's deceleration modes, and cranking modes, and the key-off electrical functions when the vehicle's engine is off, such as the vehicle alarm, computing devices, and the like. As will be described in further detail hereafter, in accordance with one embodiment, the single battery system is coupled to an energy storage (battery) management system that selectively couples the single battery to a high voltage supply for the key-on electrical function, and to a low voltage supply for the key-off electrical function.

For the purposes of the present disclosure, it should be noted that the energy storage devices, battery modules, and systems illustrated and described herein are particularly directed to applications in providing and/or storing energy in xEV electric vehicles.

Figure 5:
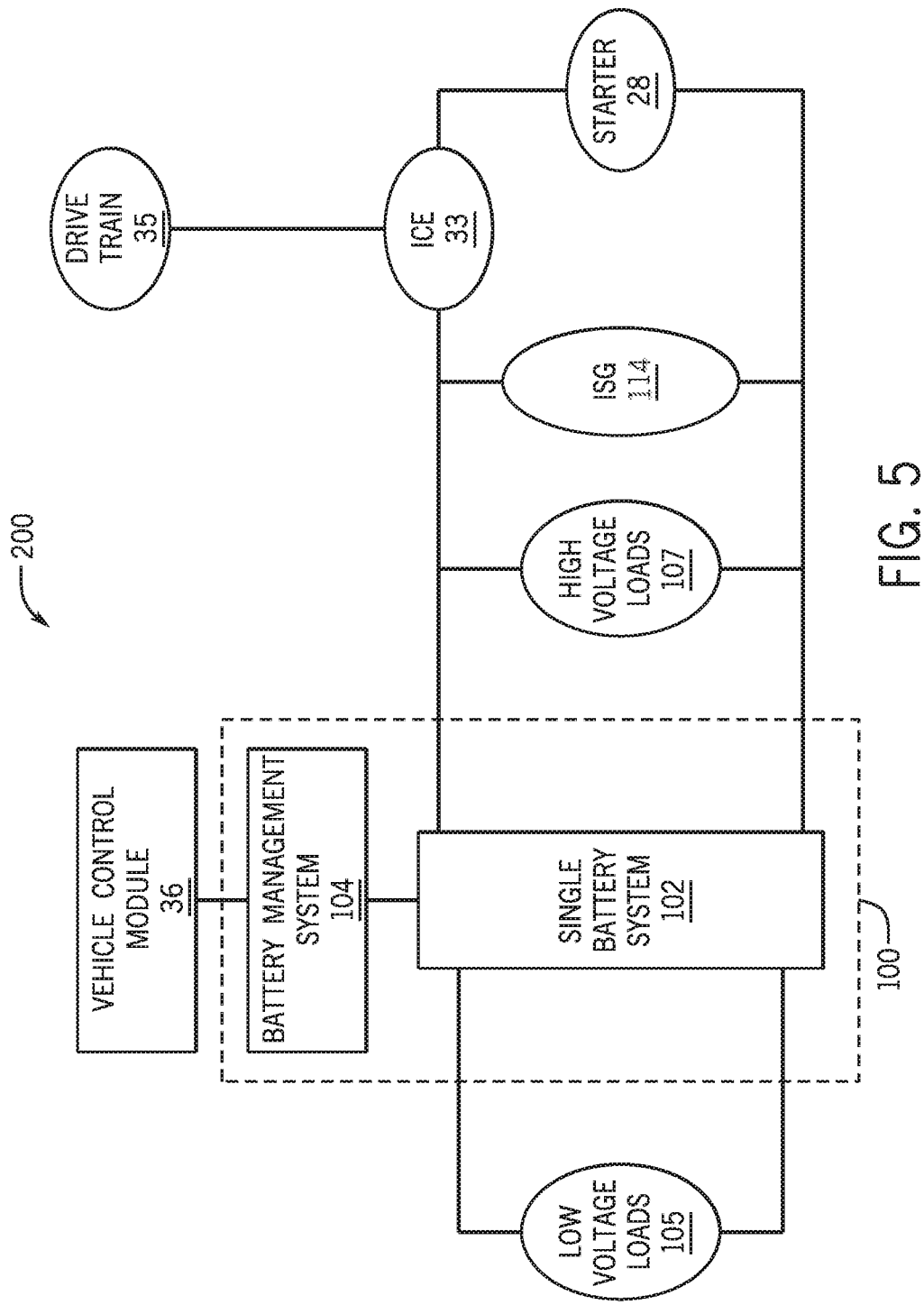
FIG. 5 is a block diagram illustrating an energy storage system (ESS) and components of the hybrid vehicle that are coupled to the ESS.

As discussed above, a micro-hybrid vehicle or a stop-start car may have an ICE that turns off when the vehicle comes to a stop, such as at an intersection. The micro-hybrid vehicle relies on an ESS at times to provide some or all power to a power network which powers the vehicle's electronics and accessories, such as air conditioning, radio and other electronics operating within the vehicle. In one embodiment, as shown in FIG. 5, the power to ESS 100 can be supplied through an integrated starter-generator (ISG) 114 that is configured as a two quadrant alternator connected to the ICE 33. ISG 114 provides the functions of starting, generating and regenerating. As such, during a regenerative braking event, ISG 114 performs as a power regenerative device by converting the vehicle's kinetic energy into electrical energy, which is provided to ESS 100. By providing some or all of the power to a power net which powers the vehicle's electronics and accessories, and by relying mainly on power from a renewable energy generating device, ESS 100 in a micro-hybrid vehicle can increase the vehicle's fuel economy.

The use of the terms battery, energy storage device, or energy storage systems are all intended to include any type of electrical energy storage devices including lead-acid battery, ultra-capacitor storage capacitors and all other energy storage devices of any type.

Now referring to FIG. 5, ESS 100 includes a single battery system 102, and a battery management system 104. As shown, single battery system 102 is coupled to electrical accessories that includes low voltage loads 105 and high voltage loads 107, and to ISG 114. Alternatively, battery management system 104 can be integrated into single battery system 102.

As shown, ISG 114 is coupled to ICE 33, and single battery system 102 is connected to receive from ISG 114 electrical energy converted from kinetic energy captured from drive train 35 during regenerative power events, such as when vehicle 10 is decelerating. Regeneration is achieved by heavily generating energy through ISG 114, this in effect adds a negative torque to ICE 33 through a serpentine belt, slowing ICE 33 and converting this energy into electric power. Further, battery management system 104 is connected to VCM 36, which is configured to communicate with ISG 114 to request a level of electric power to supply or generate to achieve smooth drivability during braking and acceleration events. VCM 36 also receives other data from multiple other sources, such as an environmental data source (not shown). The data from drive train 35 and the other sources of data obtained by VCM 36 are used by battery management system 104 to perform battery control functions, as described hereafter.

Figure 6:
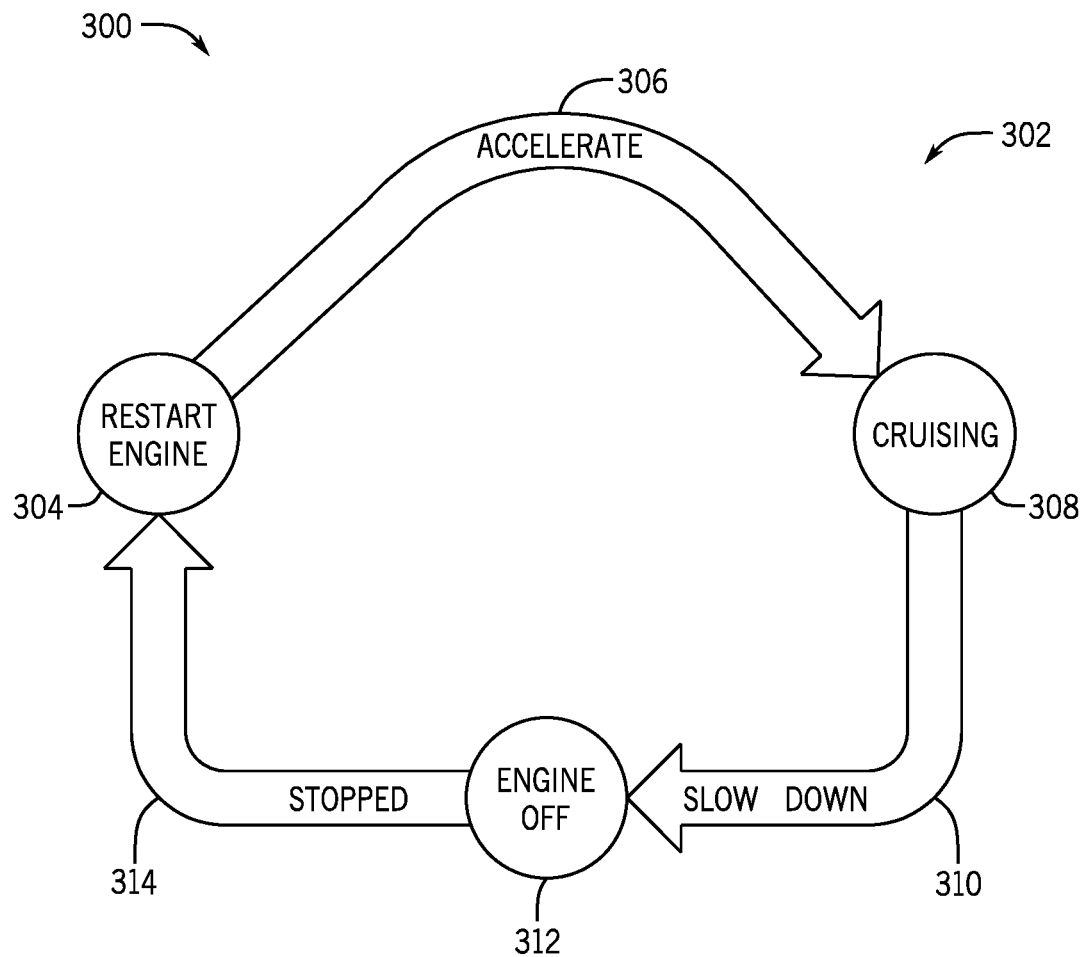
FIG. 6 is a schematic diagram illustrating an exemplary embodiment of a driving cycle as performed by a micro or mild hybrid electrical vehicle.

Now referring to FIG. 6, an exemplary embodiment 300 of a driving cycle 302 as performed by a Mild-HEV or Micro-HEV is shown. Driving cycle 302 includes six operational modes, which are a restart engine mode 304, an acceleration mode 306, a cruising mode 308, a slow-down mode 310, an engine-off mode 312, and a stopped vehicle mode 314. In one embodiment, during slowdown mode 310, ESS 100 is configured to capture braking energy through regeneration of electrical power to raise the state of charge (SOC) of single battery system 102. During engine-off mode 312, ESS 100 is configured to support vehicle accessories, such as interior and exterior lights, infotainment, fans and blowers, and electronics based the current SOCs. During acceleration mode 306, ESS 100 is configured to provide boosting power using ISG 114. Though typically, engine-off mode 312 may be inhibited based on climate control demand and battery conditions, because of the regenerating energy captured during a slow-down event (i.e., braking event), ESS 100 is configured to enable activation of electric A/C.

Figure 7:
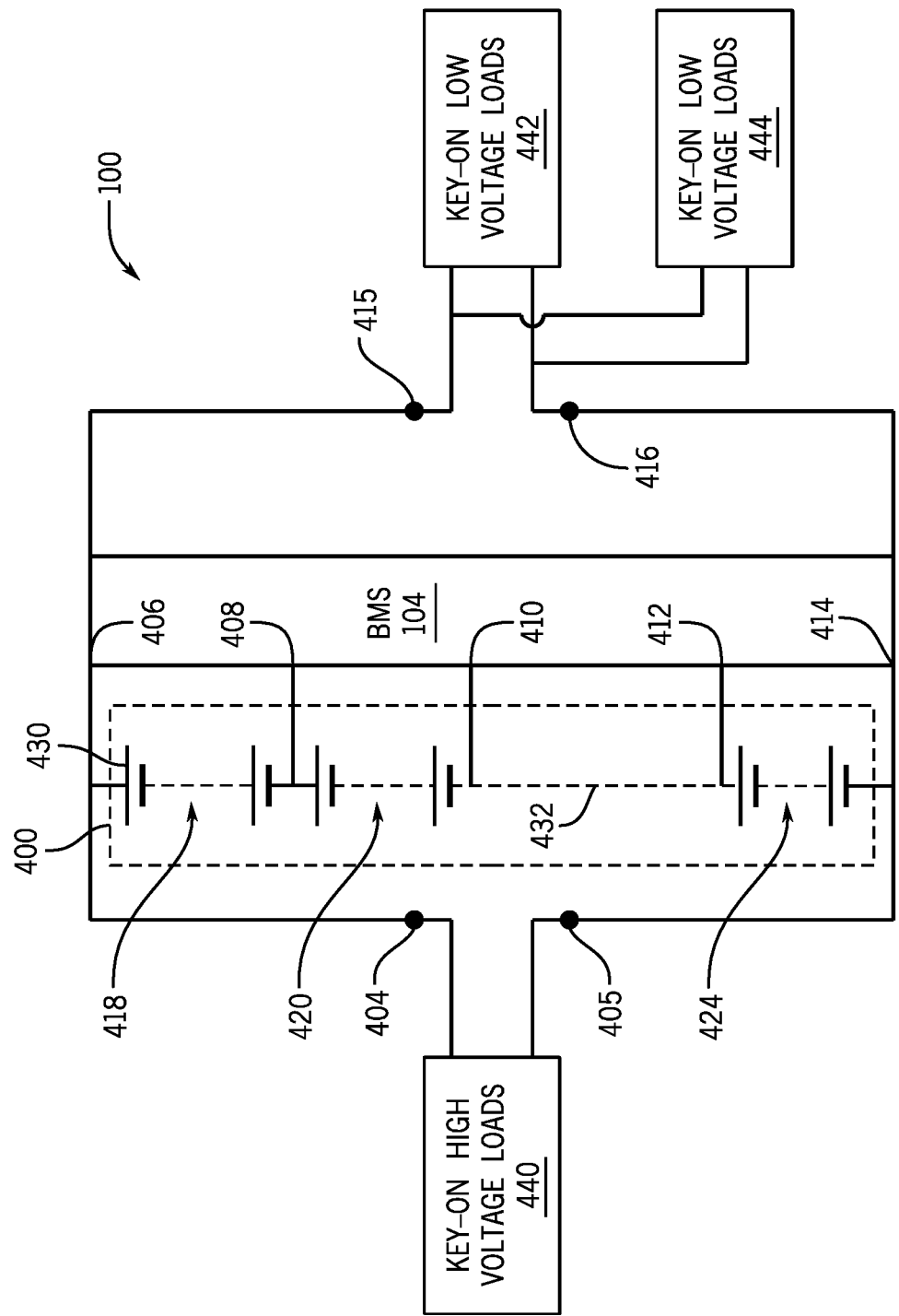
FIG. 7 is a schematic diagram illustrating an exemplary embodiment of an energy storage system including a plurality of storage modules and a battery management system.

Now referring to FIG. 7, an exemplary embodiment of dual function single battery system 102 includes a modular energy storage unit 400 connected to primary voltage terminals 404 and 405. Modular energy storage unit 400 also has a plurality of intermediate taps or outputs that are connected to inputs 406, 408, 410, 412, and 414 of BMS 104, which in turn has a pair of outputs connected with a pair of secondary voltage terminals 415 and 416.

Thus, both pairs of terminals 404 and 405, and 415 and 416 are connected to modular energy storage unit 400. In one embodiment, the terminals 405 and 416 are positive terminals, and the terminals 404 and 415 are negative terminals. In one embodiment, modular energy storage unit 400 includes three or more substantially identical energy storage modules 418, 420, and 424, each with at least one and preferably at least a pair of substantially identical cells 430 connected in series. There may also be other cells connected in parallel with cells 430. All of the modules 418, 420, and 424 are connected to each other and any other more modules that may be provided (as indicated by the broken line 432) in series across primary voltage terminals 404 and 405.

In one embodiment, each of energy storage modules 418, 420, and 424, has at least one of the following characteristics: an equal number of energy storage cells that all produce power at approximately the same voltage; a plurality of energy storage cells connected in series, a plurality of cells connected in parallel; at least one energy storage cell with chemistry of one of (a)NCA, (b) NMC, (c) $LiMn_2O_4$; (d) a blend of the chemistries of (a), (b) and (c); cells with cathode material with cell chemistry that is olivine based material; cells with cathode material made of $LiFe_{1-x}PO_4$ in which x is greater or equal to zero and less than or equal to one; and cells with cathode material that is made of olivine material Zx doped $LiFePO_4$, in which x is greater or equal to zero and less than or equal to one.

The term module, or battery module, should be understood to mean an energy storage module with one or more electrochemical or electrostatic cells connected in series or parallel combinations of such cells which parallel combinations are connected in series. An energy storage module is also an energy storage device that has opposite electrical poles accessible outside of the device in order that it may be individually switched into and out of service. For instance, an energy storage device that had only one energy storage cell with available poles would be considered a module, while a single cell connected in series with two other cells but without these connections being available for connection with other electrical element would not be considered an energy storage module. While illustrative examples are given below, the total cell count of all the modules within a given dual function energy storage device is flexible and not limited by these examples.

The different terminals, primary terminals 404 and 405, and secondary terminals 415 and 416, provide power at different voltage levels needed by different loads used when vehicle 10 is in a key-off mode and other loads used when vehicle 10 is in a key-on mode. Primary voltage terminals 404 and 405 are connected to one or more key-on high voltage loads 440 to enable primary voltage terminals 404 and 405 to provide a high voltage power supply needed for the primary functions of vehicle 10, such as providing power assistance during acceleration, receiving power regeneration during deceleration, providing cranking power, providing motive power and the like.

On the other hand, secondary voltage terminals 415 and 416 are connected to one or more key-off low voltage loads 442, such as an intrusion alarm system, an anti-theft GPS tracking device, a computer and the like, which only need low voltage power supply when the vehicle is in a key-off, non-operating mode. Additionally, or alternatively, secondary voltage terminals 415 and 416 are connected to one or more key-on relatively low voltage loads 444, of vehicle 10, such as air conditioning, heating and the like.

The voltages of key-off low voltage loads 442 may be in the range of approximately 7-volts to approximately 18-volts, while the voltage required by the high voltage loads may be as high as 660-volts for a heavy duty hybrid application and approximately 36-volts to 54-volts for a micro-hybrid application.

The junctions between modules 418 and 420 and between module 424 and whatever module with which it is contiguous, such as module 420 (if there are only three modules), are individually, respectively connected to individual ones of inputs 408, 410, and 412. In addition, the outer, or end, side of the end module 418, opposite the interior junction connected to input 408, is connected to an end, or outer, input 406 of BMS 104. Likewise, the other outer side of the other end module 424, opposite the junction connected to input 412, is connected to another outer input 414 of BMS 104. Broken line 432 should be understood to represent 1–N modules where N is any integer. Between these N modules there are N–1 junctions and each of these junctions are separately connected with BMS 104. In one embodiment, modular energy storage unit 400 can include three modules, four modules, or any higher number of modules. Each one of these modules may have the same or different numbers of cells.

In one embodiment, BMS 104 is configured to selectively control when, which ones, and how many of modules 418, 420, and 424 are connected with the secondary voltage terminals 415 and 416. On the other hand, power being supplied to primary voltage terminals 404 and 405 is taken off the end poles, or outer poles, of end modules 418 and 424 such that power to primary voltage terminals 404 and 405 is provided from the entire group of energy storage modules that comprise modular energy storage unit 400, which includes modules 418, 420, and 424, and if present, one or more modules that can be identical to or different from the modules 418, 420, and 424 in terms of the number of cells 430, for example.

In one embodiment, when power is being connected to secondary voltage terminals 415 and 416 by BMS 204, power is taken from at least one but less than all the modules of modular energy storage unit 400 used to provide the high voltage power at primary voltage terminals 404 and 405. Moreover, power for secondary voltage terminals 415 and 416 can be taken from only one of the modules, such as module 424. As stated above, the low voltage range is from approximately seven (7) volts (V) to 8V to provide power to key-off voltage loads 442, such as the vehicle alarm, computer and the like. In accordance with the present disclosure, the precise voltage that may be needed can be adjusted by altering the total number and type of energy storage cells 430 such that, for example, an industry standard of 12V for the secondary voltage level. However, preferably, the capacity of the dual function ESS 100 may range from less than four (4) ampere-hours (Ah), if ultra-capacitors are used for the energy storage devices, to more than 80 Ah, if lead acid batteries are used.

The relatively high voltage range that may be obtained also depends upon the type and size of the energy storage devices being used. Nominally, the high voltage range for micro-hybrid system is approximately 36V to 54V. In the case of a heavy duty hybrid application, the voltage provided at primary terminals 404 and 1405 may be as high as 600V. In general, it should be appreciated that the term relatively high voltage simply means a voltage that is relatively higher than the relatively low voltage, and vice versa. Inherently, the voltage provided at primary terminals 404 and 405 from all of the energy storage modules will be higher than the voltage provided by a one energy storage module or provided by number of energy storage modules less than the total number of energy storage modules in modular energy storage unit 400.

Figure 8:
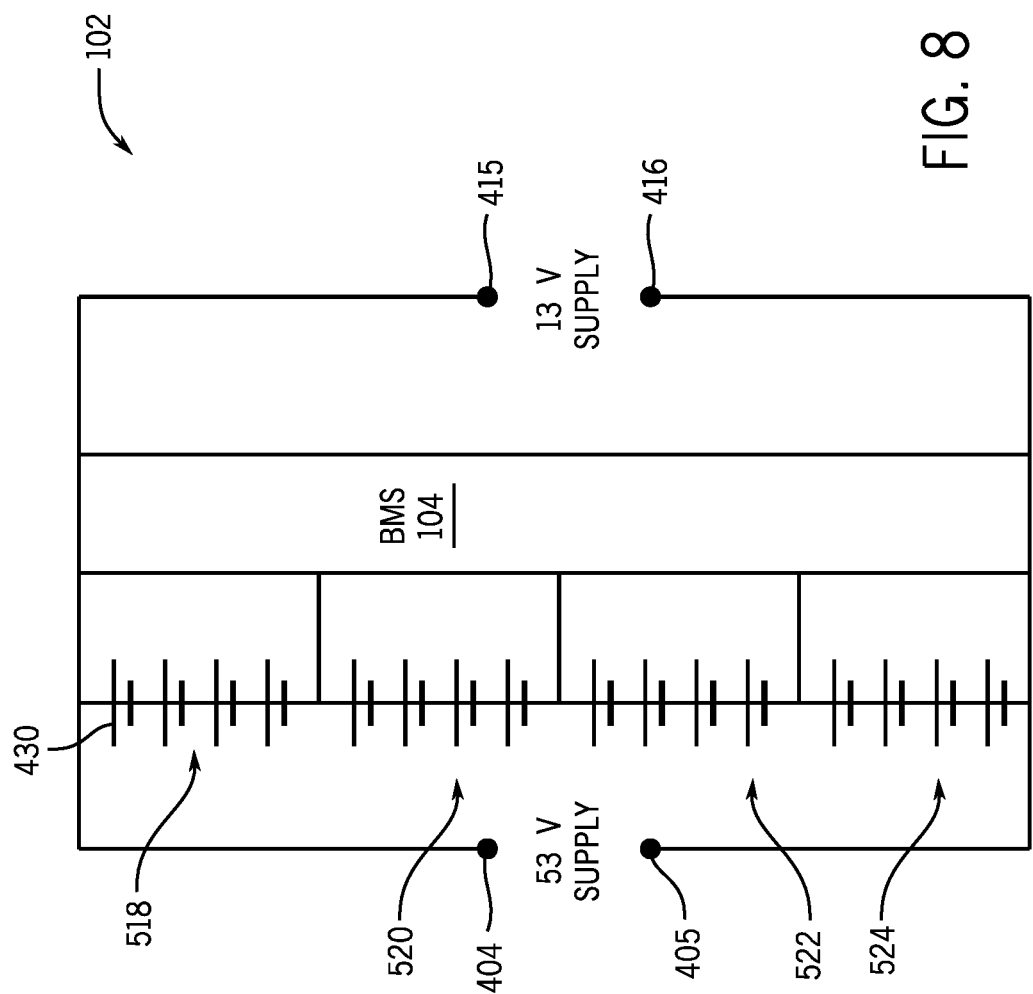
FIG. 8 is a schematic diagram of a particular embodiment of the energy storage system of FIG. 5 that provides power at 53V at a primary pair of voltage terminals and at 13V at a secondary pair of voltage terminals.

Now referring to FIG. 8, an embodiment of a particular case of dual function battery system 102 that includes four modules (i.e., N is equal to four), and the high voltage produced from all four modules at primary voltage terminals 404 and 405 is approximately 53V. The various loads 440, 442, and 444 are not shown for purposes of simplicity but the connections to these loads are the same as shown in FIG. 7.

In this embodiment, each of the four battery modules 518, 520, 522, and 524 includes four cells for a total of sixteen cells, each of which produces approximately 3.3V. All the battery modules are preferably based on LiFePO4 chemistry. Primary voltage terminals 404 and 405 supply electrical power at a 53V level to high voltage loads 440. Such relatively high voltage loads may include an electrical motor to provide electrical boost for the engine of vehicle 10 during acceleration, if vehicle 10 is a hybrid vehicle. Primary voltage terminals 404 and 405 also are connected to be charged by means of electrical regeneration during deceleration. The 53V of power available at primary voltage terminals 404 and 405 can also be used to provide cranking power to turn over and start ICE 33.

Still referring to FIG. 8, the low voltage power provided at secondary voltage terminals 415 and 416 can be taken from only a single one of the four modules 518, 520, 522, and 524 at a time, such as module 524. As each of modules 518, 520, 522, and 524 produces approximately 3.3 V, and thus approximately 13V is provided at secondary voltage terminals 415 and 416. This low voltage at these secondary voltage terminals is connected to one or more key-off low voltage loads 442, one or more key-on voltage loads 444, or both.

Figure 9:
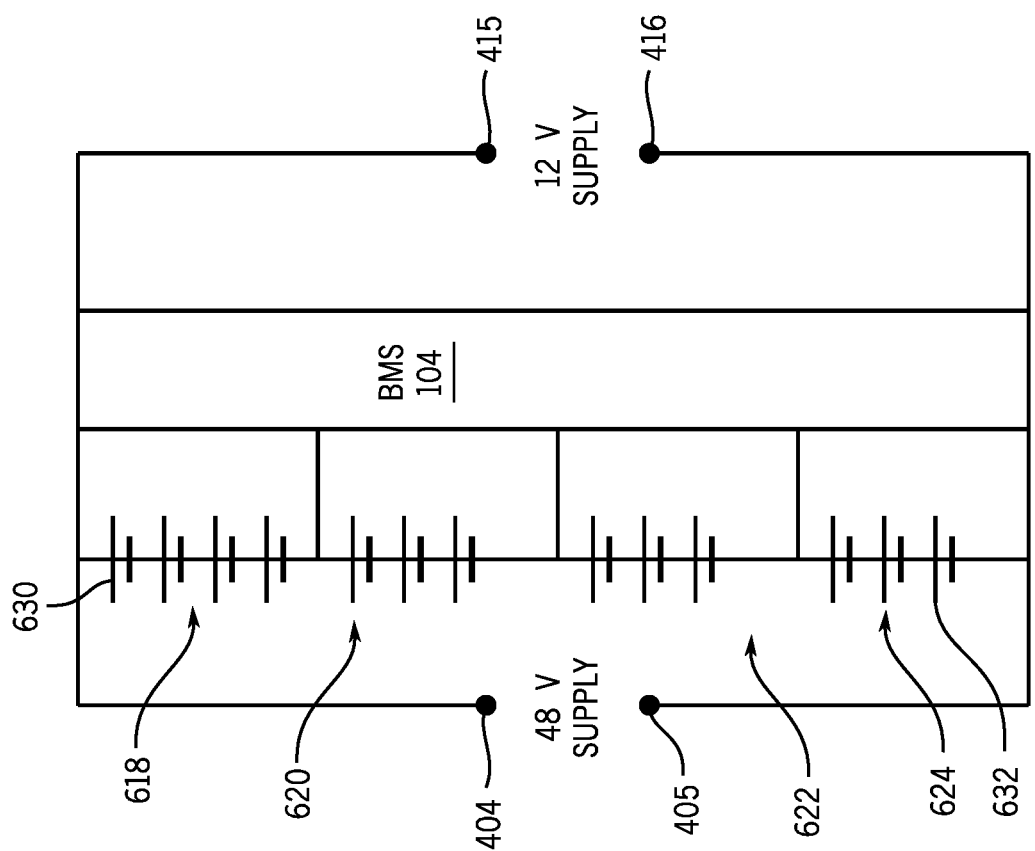
FIG. 9 is a schematic diagram of another particular embodiment of the energy storage system of FIG. 5 that provides power at 48V at the primary pair of voltage terminals and at 12V at the secondary pair of voltage terminals.

Referring now to FIG. 9, another exemplary embodiment of dual function battery system 102 is configured with a high voltage of approximately 48V provided at high voltage supply terminals 404 and 405, and a low voltage of approximately 12V is provided at the low voltage supply terminals 415 and 416. In one embodiment, a first module 618 includes four identical cells 430, and each of three other battery modules 620, 622, and 624 includes three identical cells 632 connected in series. Cells 630 may be different from or be the same as cells 632. In one embodiment, each of these thirteen cells has NCA cathode material with an average cell voltage of approximately 3.65V. Alternatively, the cell chemistry could be NMC, LiMn2O4, or blends of any of the three chemistries.

In this exemplary embodiment, module 618 uses four cells 630 to provide power at approximately 14.6V. The other three modules 620, 622, and 624 use their respective three identical cells 632 to produce an average voltage output of approximately 11V. Thus, the supplied low voltage can be provided at approximately 12V with a range between approximately 11V and 15V. Advantageously, unlike the embodiments of FIGS. 7 and 8, in this embodiment of FIG. 9, the level of low voltage provided can be selectively changed simply by changing between two battery modules of different size and capacity, such as between energy storage module 618 and any one of energy storage modules 620, 622, and 624.

In keeping with one aspect of the disclosure, BMS 104 of all the embodiments of FIGS. 7, 8, and 9 is configured to monitor the SOC of each of the associated modules and to selectively connect different ones of the modules to secondary voltage terminals 415 and 416 based on the measured SOCs. This is performed so as to prevent any one of the four battery modules, such as modules 618-624, from becoming excessively discharged beyond a preselected minimum. For example, initially when vehicle 10 is shut off, BMS 104 is configured to, for instance, connect battery module 620 to secondary voltage terminals 415 and 416.

Still referring to FIG. 9, in accordance with the present disclosure, when vehicle 10 is first shut off, all four battery modules 618, 620, 622, and 624 may have an SOC of approximately sixty percent (60%) of a full, or maximum, charge. As time passes, module 622 is slowly discharged by its connection to a load and the SOC gradually declines. When the SOC has declined to a preselected minimum SOC limit, such as 40% of full SOC, BMS 104 switches out the coupling of first battery module 618 to secondary voltage terminals 415 and 416, and then switches on the coupling to second battery module 620 to secondary voltage terminals 415 and 416. When SOC of battery module 620 approaches the preselected SOC minimum (e.g., 40% of full SOC), then BMS 104 switches the coupling from second module 620 to third battery module 622. Likewise, when the SOC of third battery module 622 decreases to 40%, BMS 104 substitutes the coupling to secondary voltage terminals 415 and 416 to fourth battery module 624 from third battery module 622. Thus, later, when vehicle 10 is again being operated and single battery system 102 is being charged during a vehicle acceleration process or regenerative process, four battery modules 618, 620, 622, and 624 will be automatically balanced with approximately equal charge.

Alternatively, cycling from one energy storage module to another for provision of the secondary voltage may be performed more rapidly, such as by switching from one energy storage module to another when the SOC level is approximately 10-30% different between modules. In such case switching from one energy storage module to the next could be performed with a timeframe of seconds to minutes.

In a key-off mode, modular energy storage unit 400 over time could become fully depleted, but in accordance with the disclosure, that can be prevented from happening. In one embodiment, when all of the energy storage modules of modular energy storage unit 400 have reached their respective lower limit SOCs (i.e., when almost depleted from a preselected low voltage limit), BMS 104 is configured to cause the disconnection of all the energy storage modules from secondary voltage terminals 415 and 416 and goes into a dead battery mode to prevent full depletion and resultant damage to the energy storage modules. When operation of vehicle 10 resumes, modular energy storage unit 400 will again become charged to a preselected level, normal operation of the dual function single battery system 102.

Figure 10:
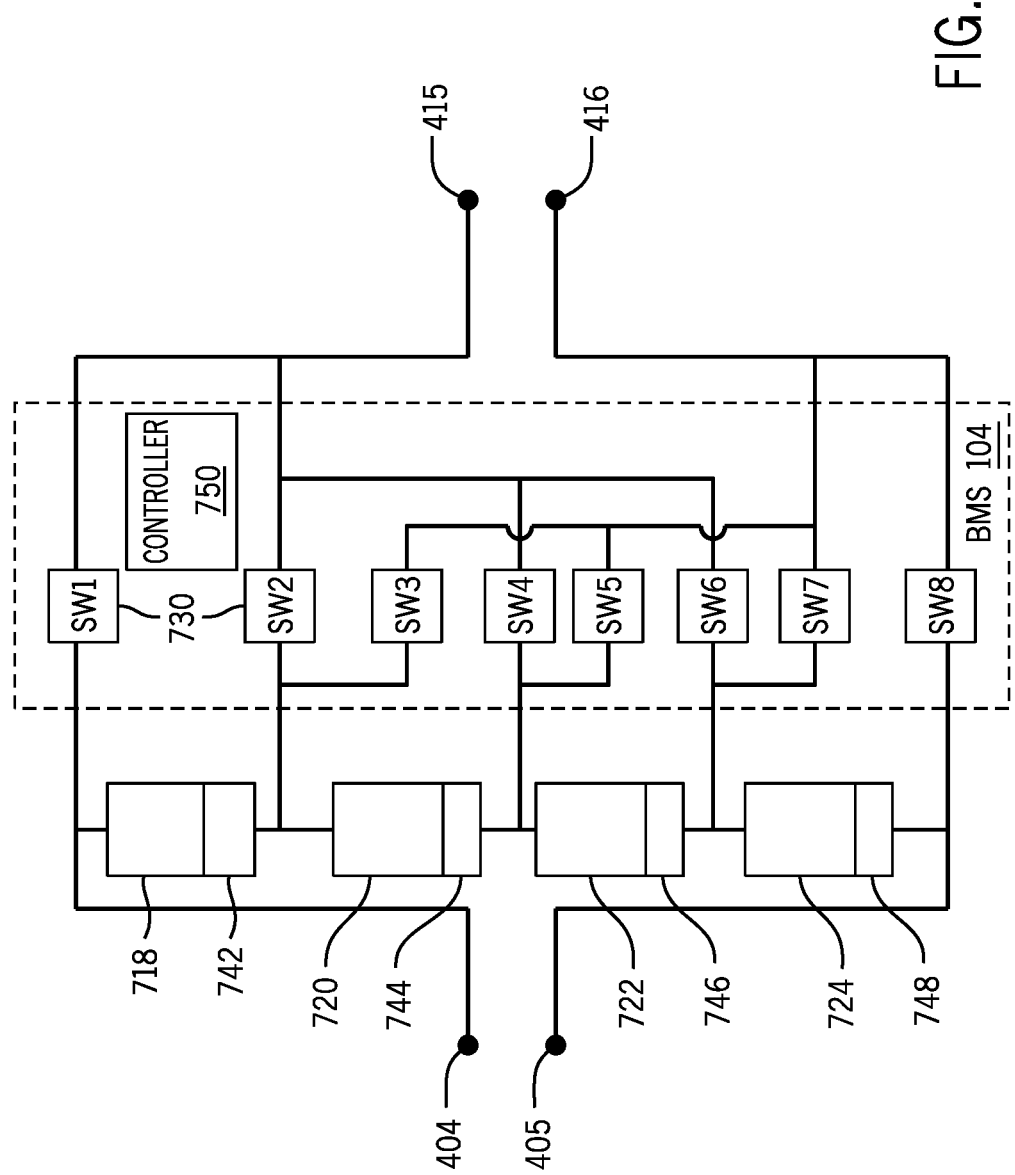
FIG. 10 is a functional block diagram of the battery management system.

Referring now to FIG. 10, an exemplary embodiment of a block diagram of BMS 104 configured to manage the dual function of single battery system 102 is shown. In accordance with the disclosure, BMS 104 includes a plurality of electronically controllable switches SW1, SW2, SW3, SW4 SW5, SW6, SW7 and SW8 730, interconnected with energy storage modules 718, 720, 722, and 724 and secondary terminals 415 and 416 to collectively define a switching network. In one embodiment, energy storage modules 718, 720, 722, and 724 include sensing units 742, 744, 746, and 748, respectively, which are configured to estimate a SOC of a corresponding energy storage module, or to provide relevant cell condition data to BMS 104 to determine the corresponding SOCs. Moreover, it should be appreciated that the term "switching network" is not intended to be limited to such a network with only eight switches, as needed for modular energy storage unit 400 with only four modules as shown in FIG. 10, but will have any suitable number of switches that are needed to individually connect each of the individual energy storage modules to secondary terminals 415 and 416. Generally, for each one of N modules to be individually connected to secondary terminals 415 and 416, BMS 204 may need 2N switches, where N is an integer number. It should be understood that the term "switch" used here is intended to not be limiting but to include any device that is capable of being selectively changed between an electrically conductive state to a nonconductive state, such as a silicon controlled rectifier, a power transistor, a relay switch or any other like device. Although the connections are not shown for purposes of simplicity, all of switches 730 are connected with a controller 750.

In one embodiment, upon detection of a key-off mode, VCM 36 is configured to trigger controller 750 to control switches 730 based on input signals received from sensing units 742, 744, 746, and 748 to successively, individually connect energy storage modules 718, 720, 722, and 724 to secondary voltage terminals 415 and 417, as described above. Alternatively, BMS 104 includes a key-off detector configured to detect when the key of vehicle 10 has been turned to a key-off position.

As shown, switches SW1, SW2, SW4 and SW6 are connected to the positive poles of the first, second, third and fourth battery modules 718, 720, 722, and 724 on one side and to the low voltage positive terminal 415. Switches SW3, SW5, SW7 and SW8 are connected to the negative poles of the first, second, third and fourth battery modules 718, 720, 722, and 724 on one side and to the negative low voltage terminal 416. These switches may be selectively controlled to selectively, individually, connect each of the four battery modules 718, 720, 722, and 724 across the secondary voltage terminals 415 and 415, one at a time, as discussed above.

For instance, when energy stored in first battery module 718 is being supplied to a load, switches SW1 and SW3 may be actuated by an activation unit (e.g., controller 750) into a conductive on state and all the other switches are deactivated into a nonconductive off state. When it is time to substitute second battery module 720 for first battery module 718, then switches SW1 and SW3 may be turned off, and switches SW2 and SW4 may be turned on.

Figure 11:
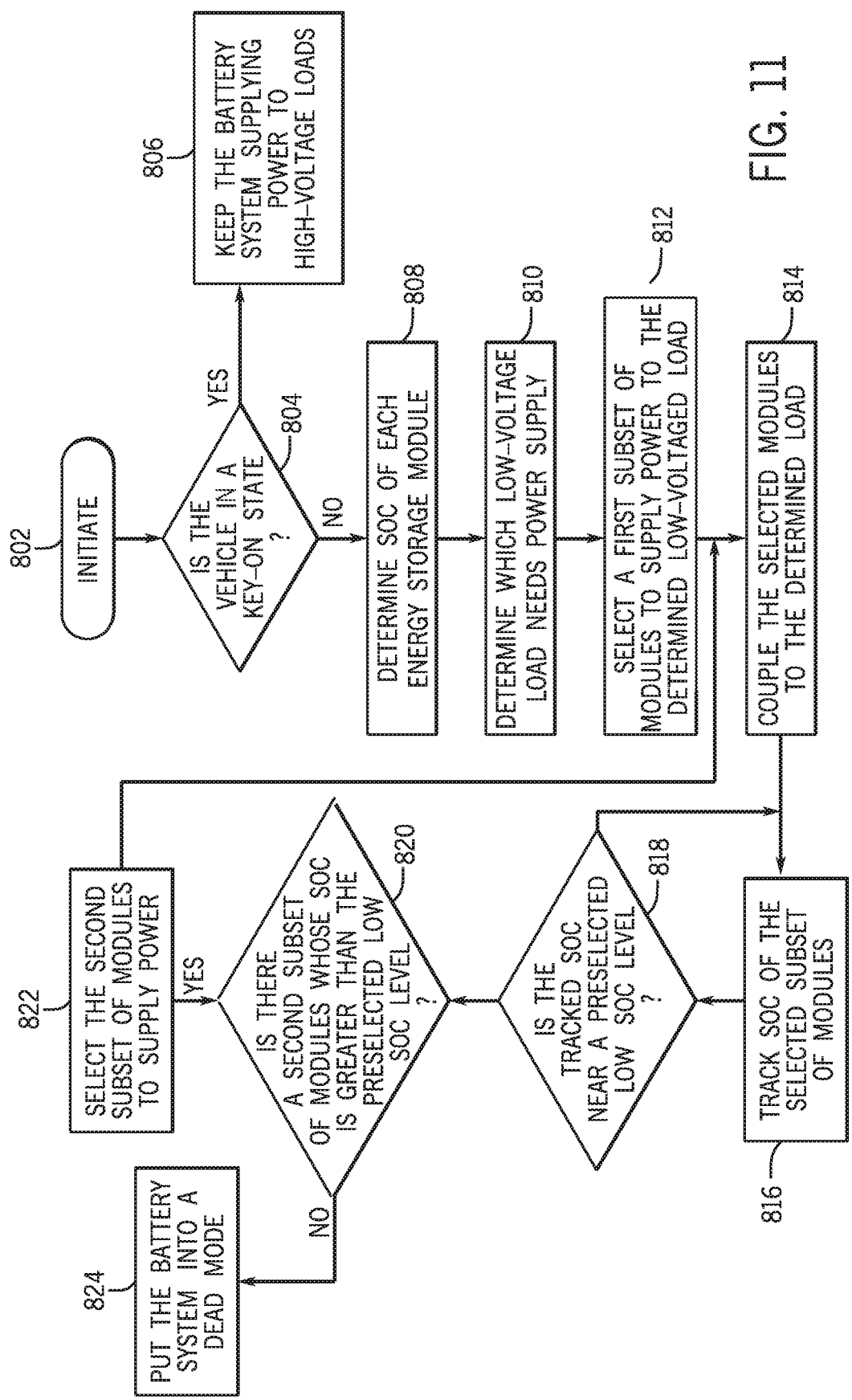
FIG. 11 is a flow chart of an operational process/method that illustrates a dual function of the energy storage system.

Now referring to FIG. 11, a flow chart shows an exemplary embodiment of a computer-implemented method (process), initiated at Step 802, for managing a dual function of an energy storage device. As stated above, BMS 104 is configured to provide stored electrical energy for operating vehicle 10 at primary energy storage terminals 404 and 405 of single battery system 102, and for supplying stored electrical energy at secondary energy storage terminals 415 and 416 to low voltage loads during a key off state of vehicle 10. VCM 36 is configured to monitor the operating mode of vehicle 10. As such, based on data received from VCM 36, BMS 104 is configured to determine whether vehicle 10 is in a key-on state, at Step 804. In the affirmative, BMS 104 is configured to keep primary voltage terminals 404 and 405 connected to one or more key-on high voltage loads 440 to provide a high voltage power supply needed for the primary functions of vehicle 10, at Step 806. Otherwise, BMS 104 is configured to determine the SOC of each of the energy storage modules using data collected/sensed by sensors associated with the module cells, at Step 808. Then, at Step 810, BMS 104 determines which of the requirement of the low voltage load needs power supply. Upon determination of which of the requirement of the low voltage load (i.e., a key-off accessory load) needs power supply, at Step 812, BMS 104 selects a first subset (one or more) of the energy storage modules that has a suitable SOC (i.e., an SOC that is above a predetermined low SOC limit) for coupling to secondary voltage terminals 415 and 416 to which the determined low voltage load is connected, at Step 814. Following this coupling, BMS 104 is configured to track the SOC level of the coupled first subset of energy storage modules, at Step 816. Then, at Step 818, BMS 104 determines whether the SOC of the coupled first subset of energy storage modules declines to a level that is near the corresponding low SOC limit. In the negative, BMS 104 keeps on tracking its SOC level, at Step 816. Otherwise, BMS 104 determines whether there is a second subset (one or more) of energy storage modules that has a suitable SOC to keep providing energy to the determined low voltage load, at Step 820. In the affirmative, BMS 104 deactivates switches that couple the previously connected first subset of energy storage modules that now has an undesirable SOC level, and activate switches to couple the second subset of energy storage modules to secondary voltage terminals 415 and 416 to which the determined low voltage load is already coupled, at Step 822. In the negative, BMS 104 goes into a dead battery mode to prevent full depletion and resultant damage to the energy storage modules. Thus, in accordance with this disclosure, BMS 104 is configured to successively connect subsets of the plurality of energy storage modules across secondary voltage terminals 415 and 416, as each subset, in turn, becomes depleted to a preselected minimum SOC level. That is, BMS 104 establishes a preselected order of succession of connection of the plurality of energy storage modules.

Advantageously, with this method, the total energy stored of modular energy storage unit 400 that is used for power at a relatively high voltage when vehicle 10 is being operated in a key-on mode can be used for providing power for accessories needing power at a relatively lower voltage. In the case of using four energy storage modules, the key-off load can be supported four times longer than could be achieved with a single energy storage device being used as a separate accessory battery.

The relatively lower voltages that are provided to the pair of secondary voltage terminals, of course, may also be provided to other key-on accessories 444 but in such case there is less need to regularly exchange energy storage modules if modular energy storage unit 400 is recharged during operation by a regenerative power source, such as regenerative braking, etc. The need of another special battery for the accessories and the resultant cost and complexity are eliminated. Further, not one of the energy storage modules becomes depleted faster than any other one and power at the secondary voltage such that when recharged all cells become charged to approximately the same level.

It should also be understood that the voltage levels indicated above are merely exemplary and are not intended to be limiting. For instance, in the case of powering only the key off low voltage loads being powered and the key-off low voltage loads being only electronic devices, to increase efficiency the voltage on the pair of secondary terminals may be as low as 5V. Also, while the present disclosure eliminates the need for DC-DC converters, a DC-DC converter could still be connected to the pair of secondary voltage terminals to provide another voltage in addition to the voltage provided by the dual function, energy storage controller provided at the pair of secondary voltage terminals.

Figure 12:
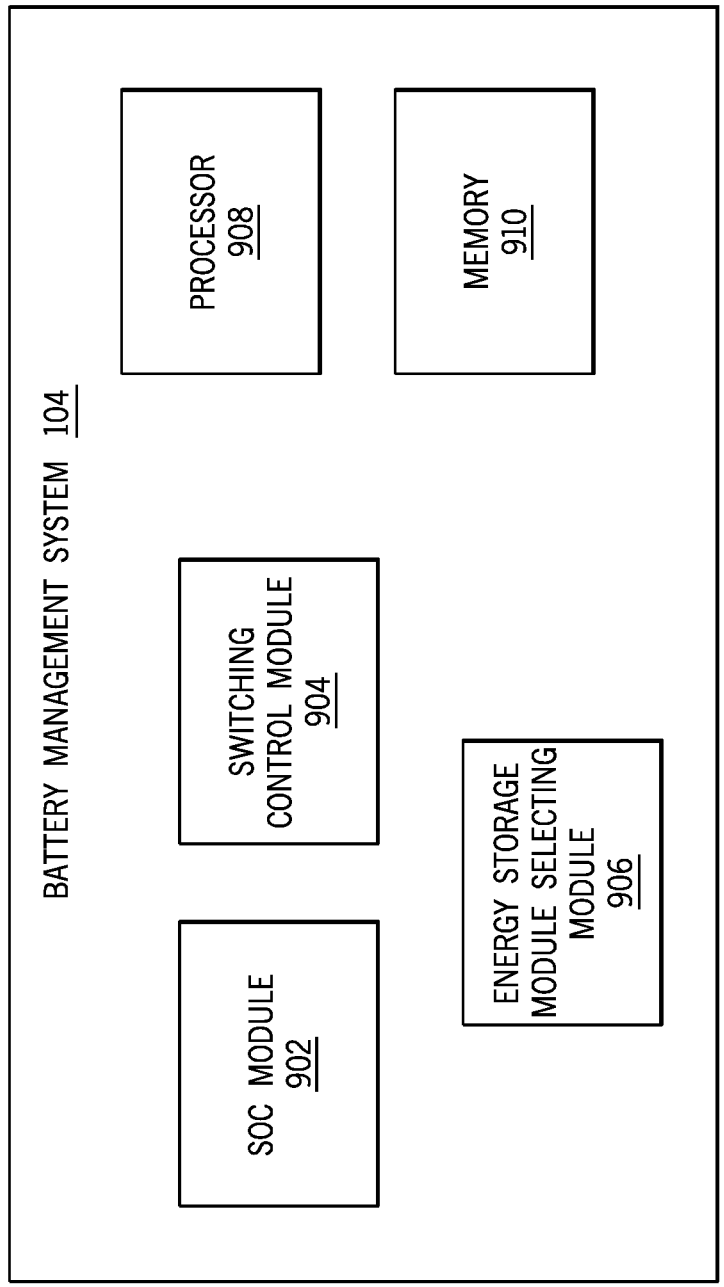
FIG. 12 is a block diagram illustrating components of a battery management system.

As shown in FIG. 12, the process performed by battery management system 104 includes an SOC module 902, a switching control module 904, an energy storage module selection module 906. Battery management system 104 includes a processing unit 908, and a memory unit 910 coupled to processing unit 908. Processing unit 908 can be implemented on a single-chip, multiple chips or multiple electrical components. For example, various architectures can be used including dedicated or embedded processor or microprocessor (μP), single purpose processor, controller or a microcontroller (μC), digital signal processor (DSP), or any combination thereof. In most cases, each of processing unit 908 together with an operating system operates to execute computer code and produce and use data. Memory unit 910 may be of any type of memory now known or later developed including but not limited to volatile memory (such as RAM), non-volatile memory (such as ROM, flash memory, etc.) or any combination thereof, which may store software that can be accessed and executed by processing unit 908, respectively, for example.

Figure 13:
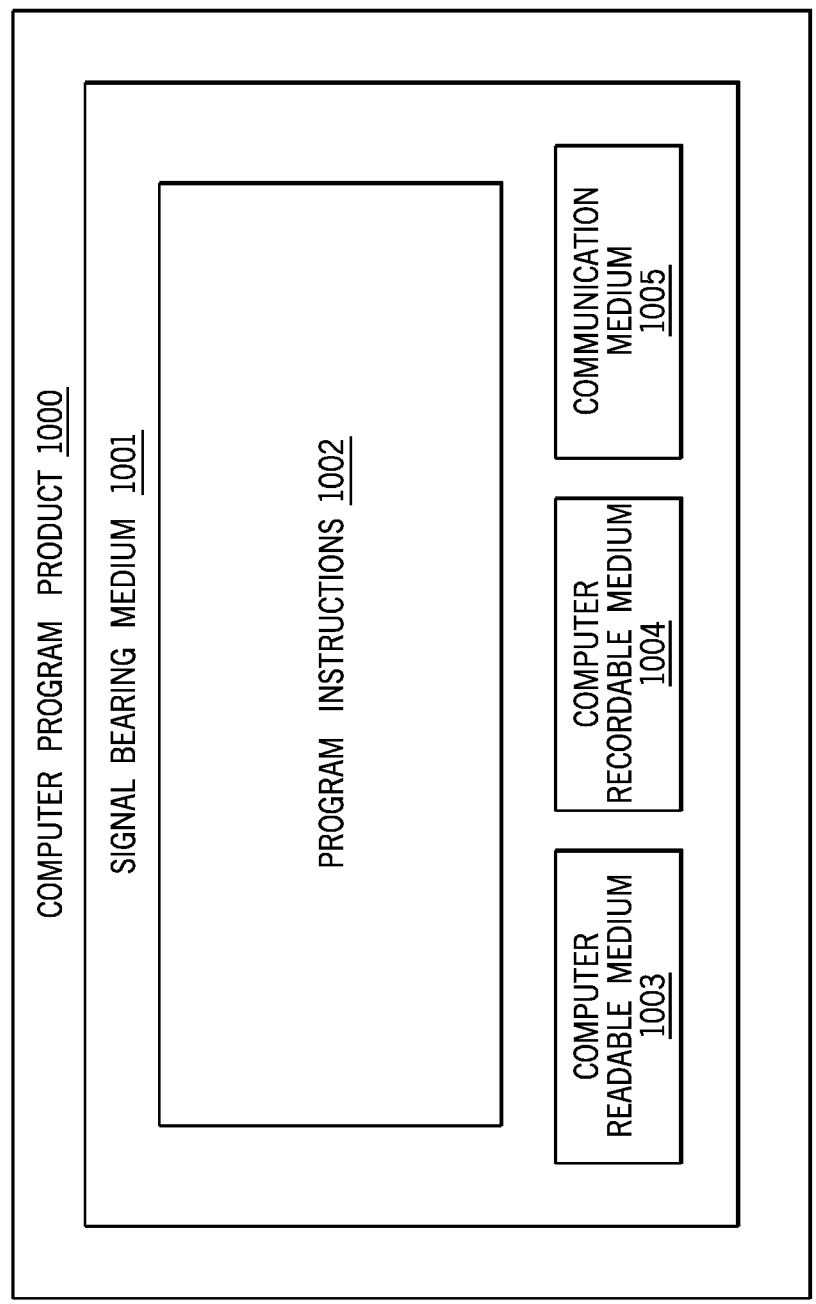
FIG. 13 is a schematic diagram illustrating a conceptual partial view of an example computer program product.

In some embodiments, the disclosed method may be implemented as computer program instructions encoded on a computer-readable storage media in a machine-readable format. FIG. 13 is a schematic illustrating a conceptual partial view of an example computer program product 1000 that includes a computer program for executing a computer process on a computing device, arranged according to at least some embodiments presented herein. In one embodiment, the example computer program product 1000 is provided using a signal bearing medium 1001. The signal bearing medium 1001 may include one or more programming instructions 1002 that, when executed by a processing unit may provide functionality or portions of the functionality described above with respect to FIGS. 5-11. Thus, for example, referring to the embodiment shown in FIG. 11, one or more features of blocks 802-824, may be undertaken by one or more instructions associated with the signal bearing medium 1001.

In some examples, signal bearing medium 1001 may encompass a non-transitory computer-readable medium 1003, such as, but not limited to, a hard disk drive, memory, etc. In some implementations, the signal bearing medium 1001 may encompass a computer recordable medium 1004, such as, but not limited to, memory, read/write (R/W) CDs, R/W DVDs, etc. In some implementations, signal bearing medium 1001 may encompass a communications medium 1005, such as, but not limited to, a digital and/or an analog communication medium (e.g., a fiber optic cable, a waveguide, a wired communications link, etc.).

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

One or more of the disclosed embodiments, alone or in combination, may provide one or more technical effects useful in the dual functioning of an energy storage system. The technical effects and technical problems in the specification are exemplary and are not limiting. It should be noted that the embodiments described in the specification may have other technical effects and can solve other technical problems.

While only certain features and embodiments of the disclosure have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A battery module comprising:
    a first terminal pair configured to electrically couple the battery module to a first voltage domain;
    a second terminal pair configured to electrically couple the battery module to a second voltage domain;
    a plurality of battery cells electrically coupled in series between a first terminal of the first terminal pair and a second terminal of the first terminal pair;
    a plurality of switches comprising:
        a first switch electrically coupled between a first battery cell of the plurality of battery cells and a third terminal of the second terminal pair;
        a second switch electrically coupled between the first battery cell of the plurality of battery cells and a fourth terminal of the second terminal pair;
        a third switch electrically coupled between a second battery cell of the plurality of battery cells and the third terminal of the second terminal pair; and
        a fourth switch electrically coupled between the second battery cell of the plurality of battery cells and the fourth terminal of the second terminal pair;
    a plurality of sensing units configured to measure operational parameters of the plurality of battery cells; and
    a controller communicatively coupled to the plurality of switches and the plurality of sensing units, the controller being configured to:
        determine a first state of charge of the first battery cell of the plurality of battery cells based at least in part on the operational parameters measured by the plurality of sensing units; and
        when the first state of charge of the first battery cell is less than a state of charge threshold:
            instruct the first switch and the second switch of the plurality of switches to open to electrically disconnect the first battery cell from the second terminal pair;
            determine a second state of charge of the second battery cell of the plurality of battery cells based at least in part on the operational parameters measured by the plurality of sensing units;
            instruct the third switch and the fourth switch of the plurality of switches to close to electrically connect the second battery cell to the second terminal pair when the second state of charge of the second battery cell is not less than the state of charge threshold to enable the battery module to supply electrical power in the second voltage domain to an electrical load;
            receive a requested state of charge associated with a device electrically coupled to the second terminal pair; and
            set the state of charge threshold based at least in part on the requested state of charge.

2. The battery module of claim 1, comprising:
    a fifth switch electrically coupled between a third battery cell of the plurality of battery cells and the third terminal of the second terminal pair; and
    a sixth switch electrically coupled between the third battery cell of the plurality of battery cells and the fourth terminal of the second terminal pair.

3. The battery of module of claim 2, wherein the controller is configured to instruct the fifth switch and the sixth switch of the plurality of switches to close to electrically connect the third battery cell to the second terminal pair when the second state of charge of the second battery cell is less than the state of charge threshold.

4. The battery module of claim 1, wherein the controller is configured to instruct the first switch and the second switch of the plurality of switches to close to electrically connect the first battery cell to the second terminal pair when the first state of charge of the first battery cell is not less than the state of charge threshold.

5. The battery module of claim 1, wherein the second terminal of the first terminal pair is electrically coupled to the fourth terminal of the second terminal pair.

6. The battery module of claim 1, comprising a key-off detector configured to detect when a key of the vehicle has been turned to a key-off position, and wherein, in response to a key-off detection, the controller is configured to selectively connect one of the plurality of battery cells across the second terminal pair to provide power to a key-off accessory of the vehicle.

7. The battery module of claim 1, further comprising a key-off detector configured to detect when a key of the vehicle has been turned to a key-on position, and wherein, in response to a key-on detection, the controller is configured to couple each of the plurality of battery cells across the first terminal pair.

8. The battery module of claim 1, wherein at least one battery cell of the plurality of battery cells comprises a chemistry of one of (a) NCA, (b) NMC, (c) LiMn2O4, and (d) a blend of the chemistries of (a), (b), and (c).

9. The battery module of claim 1, the first voltage domain is non-overlapping with the second voltage domain.

10. A three terminal battery module, comprising:
    a housing;
    a plurality of battery cells disposed within the housing;
    a plurality of battery terminals formed on the housing and electrically coupled to the plurality of battery cells, the battery module being configured to:
        operate in a first voltage domain when a first electrical device is electrically coupled to a first terminal of the plurality of battery terminals and a second terminal of the plurality of battery terminals; and
        operate in a second voltage domain non-overlapping with the first voltage domain when a second electrical device is electrically coupled to the second terminal of the plurality of battery terminals and a third terminal of the plurality of battery terminals;
    one or more switches disposed within the housing and electrically coupled between the plurality of battery cells and the plurality of battery terminals;
    one or more sensing units configured to measure operational parameters of the three terminal battery module; and
    a controller communicatively coupled to the one or more switches and the one or more sensing units, the controller being configured to:
        determine the operational parameters of the three terminal battery module measured by the one or more sensing units;
        control switching of the one or more switches to facilitate controlling charging of the battery module, discharging of the battery module, or both based at least in part on the operational parameters of the three terminal battery module measured by the one or more sensing units;
        receive a requested state of charge associated with a device electrically coupled to the three terminal battery module; and
        set a state of charge threshold for at least one battery cell of the three terminal battery module based at least in part on the requested state of charge.

11. The three terminal battery module of claim 10, wherein the one or more switches include:
    a first switch electrically coupled between a first battery cell of the plurality of battery cells and the second terminal of the plurality of battery terminals;
    a second switch electrically coupled between a first battery cell of the plurality of battery cells and the third terminal of the plurality of battery terminals;
    a third switch electrically coupled between a second battery cell of the plurality of battery cells and the second terminal of the plurality of battery terminals; and
    a fourth switch electrically coupled between the second battery cell of the plurality of battery cells and the third terminal of the plurality of battery terminals.

12. The three terminal battery module of claim 11, further comprising:
    an activation unit for selectively opening or closing associated pairs of the one or more switches connected to the positive and negative poles of the plurality of battery cells.

13. The three terminal battery module of claim 10, wherein the controller is configured to:

determine a first state of charge of the first battery cell of the plurality of battery cells based at least in part on the operational parameters measured by the plurality of sensing units;
    when the first state of charge is less than a state of charge threshold: instruct a first switch and a second switch of a plurality of switches to open to electrically disconnect the first battery cell from the second terminal and the third terminal;
    determine a second state of charge of the second battery cell of the plurality of battery cells based at least in part on the operational parameters measured by the plurality of sensing units; and
    instruct a third switch and a fourth switch of the plurality of switches to close to electrically connect the second battery cell to the second terminal pair to enable the battery module to supply electrical power in the second voltage domain to an electrical load.

14. The three terminal battery module of claim 10, wherein the first voltage domain is approximately 48V and the second voltage domain is approximately 12V.

15. The three terminal battery module of claim 10, further comprising a key-off detector configured to detect when the key of a vehicle has been turned to a key-off position, and wherein in response to the key-off detection the controller selectively connects one of the plurality of plurality of battery cells across the second terminal and the third terminal to provide power to a key-off accessory of the vehicle.

16. The battery module of claim 10, wherein at least one battery cell of the plurality of battery cells comprises a chemistry of one of (a) NCA, (b) NMC, (c) LiMn2O4, and (d) a blend of the chemistries of (a), (b), and (c).

17. A computing system, comprising:
    at least one processing unit and at least one memory unit storing instructions that are operable, when executed by the at least one processing unit, to cause the at least one processing unit to perform a method for performing dual functions of a three terminal battery module in a vehicle, the method comprising:
    operating in a first voltage domain when a first electrical device is electrically coupled to a first terminal of a plurality of battery terminals and a second terminal of the plurality of battery terminals to provide stored electrical power for supporting primary electrical functions of the vehicle during a key-on state;
    operating in a second voltage domain non-overlapping with the first voltage domain when a second electrical device is electrically coupled to the second terminal of the plurality of battery terminals and a third terminal of the plurality of battery terminals, wherein operating at the second voltage domain comprises providing stored electrical power from a reduced number of the plurality battery cells via operation of a switching network;
    receiving a requested state of charge associated with a device electrically coupled to the three terminal battery module; and
    setting a state of charge threshold for at least one battery cell of the three terminal battery module based at least in part on the requested state of charge.

18. The computing system of claim 17, further comprising:
    estimating a first state of charge of one of the reduced number of the plurality of battery cells connected across the second terminal and the third terminal;
    determining whether the one of the reduced number of the plurality of battery cells should be disconnected from the second terminal and the third terminal and whether one of a remainder of the plurality of battery cells not initially included in the reduced number of the plurality of battery cells should be connected across the second terminal and the third terminal based on the first state of charge of the one of the reduced number of the plurality of battery cells;

instructing a plurality of switches to open to disconnect the one of the reduced number of the plurality of battery cells from the second terminal and the third terminal in response to a difference between the first state of charge and a preselected state of charge level being less than a predetermined value.

19. The computing system of claim 18, further comprising:

estimating a second state of charge of the one of the remainder of the plurality of battery cells; and instructing a plurality of switches to close to connect the one of the remainder of the plurality of battery cells to the second terminal and the third terminal in response to a difference between the second state of charge and the preselected state of charge level being greater than the predetermined value.

\* \* \* \* \*